United States Patent
Vigier et al.

(10) Patent No.: US 11,514,502 B2
(45) Date of Patent: Nov. 29, 2022

(54) BEACON TRIGGERED DEVICE TO DEVICE CONTENT TRANSFER SYSTEM AND METHOD

(71) Applicant: Apple Inc., Cupertino, CA (US)

(72) Inventors: Benjamin Vigier, San Francisco, CA (US); Corey G. Fugman, Saratoga, CA (US); Filip Krsmanovic, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 118 days.

(21) Appl. No.: 16/275,274

(22) Filed: Feb. 13, 2019

(65) Prior Publication Data

US 2019/0180346 A1 Jun. 13, 2019

Related U.S. Application Data

(62) Division of application No. 14/586,571, filed on Dec. 30, 2014, now Pat. No. 10,210,561.

(Continued)

(51) Int. Cl.
*G06Q 30/00* (2012.01)
*G06Q 30/06* (2012.01)
*H04W 4/80* (2018.01)

(52) U.S. Cl.
CPC ..... *G06Q 30/0633* (2013.01); *G06Q 30/0603* (2013.01); *G06Q 30/0621* (2013.01); *G06Q 30/0641* (2013.01); *H04W 4/80* (2018.02)

(58) Field of Classification Search
CPC ............... G06Q 30/00; G06Q 30/0633; G06Q 30/0603; G06Q 30/0601–0645; G06Q 30/08; H04W 4/80

(Continued)

(56) References Cited

U.S. PATENT DOCUMENTS 6,002,918 A 12/1999 Heiman
6,816,730 B2 11/2004 Davies
(Continued)

FOREIGN PATENT DOCUMENTS

CN 102568335 7/2012
CN 102638610 8/2012
(Continued)

OTHER PUBLICATIONS

Digital-download kiosks in store for retail, other verticals. (Jun. 24, 2009). Retrieved from https://www.kioskmarketplace.com/articles/digital-download-kiosks-in-store-for-retail-other-verticals-2/ (Year: 2009).*

(Continued)

*Primary Examiner* — Jeffrey A. Smith
*Assistant Examiner* — Lindsey B Smith
(74) *Attorney, Agent, or Firm* — Fish & Richardson P.C.

(57) ABSTRACT

Techniques and systems for beacon triggered device to device content transfer are disclosed. A described technique includes presenting, at an interactive beacon device, content including an interactive store catalog; receiving, at the interactive beacon device, user input responsive to the content; generating, at the interactive beacon device, a beacon message that can include transaction information based on the user input and the content, the transaction information including a service or product identifier corresponding to a product or service selected from the interactive store catalog; and transmitting, from the interactive beacon device, the beacon message over a short-range communication link to a mobile device. The beacon message can be configured to cause an application on the mobile device to advance a transaction associated with the transaction information.

20 Claims, 10 Drawing Sheets

Related U.S. Application Data

(60) Provisional application No. 62/057,612, filed on Sep. 30, 2014.

(58) Field of Classification Search
USPC .................................. 705/26.8, 26.1–27.2
See application file for complete search history.

(56) References Cited

U.S. PATENT DOCUMENTS

| | | | |
|---|---|---|---|
| 7,010,267 | B2 | 3/2006 | Vanluijt |
| 7,397,424 | B2 | 7/2008 | Houri |
| 7,653,573 | B2 | 1/2010 | Hayes |
| 7,712,657 | B1 | 5/2010 | Block |
| 7,856,234 | B2 | 12/2010 | Alizadeh-Shabdiz et al. |
| 7,890,116 | B2 | 2/2011 | Salokannel |
| 7,899,583 | B2 | 3/2011 | Mendelson |
| 7,924,149 | B2 | 4/2011 | Mendelson |
| 8,054,219 | B2 | 11/2011 | Alizadeh-Shabdiz |
| 8,160,045 | B1 | 4/2012 | Chhabra |
| 8,223,074 | B2 | 7/2012 | Alizadeh-Shabdiz |
| 8,239,276 | B2 | 8/2012 | Lin et al. |
| 8,254,414 | B2 | 8/2012 | Sakoda |
| 8,369,264 | B2 | 2/2013 | Brachet et al. |
| 8,478,297 | B2 | 7/2013 | Morgan et al. |
| 8,626,135 | B1 * | 1/2014 | Schilit .................... H04W 4/80 455/414.1 |
| 8,645,213 | B2 | 2/2014 | Granbery |
| 8,831,642 | B2 | 9/2014 | Moldavsky |
| 8,836,580 | B2 | 9/2014 | Mendelson |
| 8,866,673 | B2 | 10/2014 | Mendelson |
| 8,896,485 | B2 | 11/2014 | Mendelson |
| 8,941,485 | B1 | 1/2015 | Mendelson |
| 8,983,493 | B2 | 3/2015 | Brachet et al. |
| 9,020,687 | B2 | 4/2015 | Mendelson |
| 9,204,251 | B1 | 12/2015 | Mendelson |
| 9,204,257 | B1 | 12/2015 | Mendelson |
| 9,317,867 | B2 | 4/2016 | Johnson |
| 9,426,615 | B2 | 8/2016 | Vigier et al. |
| 9,456,416 | B2 | 9/2016 | Vigier et al. |
| 10,210,561 | B2 | 2/2019 | Vigier |
| 10,278,197 | B2 | 4/2019 | Vigier et al. |
| 10,296,950 | B2 | 5/2019 | Vigier et al. |
| 10,664,856 | B2 | 5/2020 | Robbin |
| 11,238,503 | B2 | 2/2022 | Vigier et al. |
| 2003/0098892 | A1 | 5/2003 | Hiipakka |
| 2003/0200489 | A1 | 10/2003 | Hars |
| 2006/0104600 | A1 | 5/2006 | Abrams |
| 2006/0173790 | A1 | 8/2006 | Park |
| 2006/0180664 | A1 | 8/2006 | Barrett et al. |
| 2008/0154735 | A1 | 6/2008 | Carlson |
| 2010/0150122 | A1 | 6/2010 | Berger |
| 2010/0174599 | A1 | 7/2010 | Rosenblatt |
| 2010/0198614 | A1 | 8/2010 | Chopra |
| 2010/0287052 | A1 | 11/2010 | Minter |
| 2011/0028160 | A1 | 2/2011 | Roeding et al. |
| 2011/0060652 | A1 | 3/2011 | Morton |
| 2011/0178863 | A1 | 7/2011 | Daigle |
| 2011/0238514 | A1 | 9/2011 | Ramalingam et al. |
| 2011/0238517 | A1 | 9/2011 | Ramalingam |
| 2011/0319072 | A1 | 12/2011 | Ekici |
| 2011/0320293 | A1 | 12/2011 | Khan |
| 2012/0042036 | A1 | 2/2012 | Lan et al. |
| 2012/0064855 | A1 | 3/2012 | Mendelson |
| 2012/0101951 | A1 * | 4/2012 | Li .................... G06Q 20/3829 705/71 |
| 2012/0290336 | A1 | 11/2012 | Rosenblatt et al. |
| 2012/0296686 | A1 | 11/2012 | Fugman et al. |
| 2013/0032634 | A1 | 2/2013 | Mckirdy |
| 2013/0046602 | A1 | 2/2013 | Grigg |
| 2013/0094536 | A1 | 4/2013 | Hui |
| 2013/0099920 | A1 | 4/2013 | Song |
| 2013/0110728 | A1 | 5/2013 | Kobres et al. |
| 2013/0117084 | A1 | 5/2013 | Rooke et al. |
| 2013/0128786 | A1 | 5/2013 | Sultan et al. |
| 2013/0159027 | A1 | 6/2013 | Naor |
| 2013/0193201 | A1 | 8/2013 | Bradley et al. |
| 2013/0210360 | A1 | 8/2013 | Ljung |
| 2013/0212017 | A1 | 8/2013 | Bangia |
| 2013/0281084 | A1 | 10/2013 | Batada et al. |
| 2013/0290106 | A1 | 10/2013 | Bradley et al. |
| 2013/0290718 | A1 * | 10/2013 | Zhuang .................... G06F 21/74 713/168 |
| 2013/0297422 | A1 | 11/2013 | Hunter |
| 2013/0316725 | A1 | 11/2013 | MacGougan |
| 2014/0025232 | A1 | 1/2014 | Cuddihy |
| 2014/0025504 | A1 | 1/2014 | Butler et al. |
| 2014/0058812 | A1 | 2/2014 | Bender et al. |
| 2014/0058897 | A1 | 2/2014 | Yang |
| 2014/0064166 | A1 | 3/2014 | HomChaudhuri |
| 2014/0081720 | A1 | 3/2014 | Wu |
| 2014/0089061 | A1 | 3/2014 | Vitale |
| 2014/0108149 | A1 | 4/2014 | Jabara et al. |
| 2014/0135042 | A1 | 5/2014 | Buchheim |
| 2014/0136312 | A1 | 5/2014 | Saksena et al. |
| 2014/0143139 | A1 | 5/2014 | Koplovitz |
| 2014/0154984 | A1 | 6/2014 | Perrin et al. |
| 2014/0207614 | A1 | 7/2014 | Ramaswamy |
| 2014/0207682 | A1 | 7/2014 | Wolfond |
| 2014/0214598 | A1 * | 7/2014 | Acker, Jr. ............ G07G 1/0081 705/26.8 |
| 2014/0236478 | A1 | 8/2014 | Mermeistein |
| 2014/0274150 | A1 | 9/2014 | Marti et al. |
| 2014/0324627 | A1 | 10/2014 | Haver et al. |
| 2014/0324994 | A1 | 10/2014 | Sun |
| 2014/0342760 | A1 | 11/2014 | Moldavsky et al. |
| 2014/0358835 | A1 | 12/2014 | Marti |
| 2015/0063323 | A1 | 3/2015 | Sadek |
| 2015/0079942 | A1 | 3/2015 | Kostka et al. |
| 2015/0120509 | A1 | 4/2015 | Moring |
| 2015/0140982 | A1 | 5/2015 | Postrel |
| 2015/0235486 | A1 | 8/2015 | Ellis et al. |
| 2015/0262117 | A1 * | 9/2015 | Li ........................ G06Q 10/087 235/385 |
| 2015/0278864 | A1 | 10/2015 | McDevitt |
| 2015/0281302 | A1 * | 10/2015 | Winston .................. H04L 67/02 709/219 |
| 2015/0289207 | A1 | 10/2015 | Kubo et al. |
| 2015/0294517 | A1 | 10/2015 | Herrala |
| 2015/0332383 | A1 * | 11/2015 | Ragan .................... G06Q 20/12 705/26.8 |
| 2015/0339694 | A1 | 11/2015 | Robbin et al. |
| 2016/0092860 | A1 * | 3/2016 | Klingen ................ G06Q 20/027 705/35 |
| 2016/0092943 | A1 | 3/2016 | Vigier et al. |
| 2016/0092966 | A1 | 3/2016 | Vigier et al. |
| 2016/0094940 | A1 | 3/2016 | Vigier et al. |
| 2016/0095063 | A1 | 3/2016 | Vigier et al. |
| 2016/0148270 | A1 | 5/2016 | Vigier et al. |
| 2016/0353463 | A1 | 12/2016 | Vigier et al. |
| 2019/0272567 | A1 | 9/2019 | Vigier et al. |

FOREIGN PATENT DOCUMENTS

| | | |
|---|---|---|
| EP | 2693384 | 2/2014 |
| EP | 2 733 502 | 5/2014 |
| WO | WO200157758 | 9/2001 |
| WO | WO2014130958 | 8/2014 |

OTHER PUBLICATIONS

Sci-Fi Future: Samsung Introduces Interactive Posters Alongside New Phone. (Jun. 28, 2012). Retrieved from https://www.wired.com/2012/06/samsung-sci-fi-future/ (Year: 2012).*

Martin, Chuck, How Beacons are Changing the Shopping Experience, Sep. 1, 2014, Harvard Business Review, accessed at [https://hbr.org/2014/09/how-beacons-are-changing-the-shopping-experience] (Year: 2014).*

Digital-download kiosks in store for retail, other verticals. (Jun. 24, 2009). Retrieved from https://www.kioskmarketplace.com/articles/digital-download-kiosks-in-store-for-retail-other-certicals-2/ (Year: 2009).

(56) References Cited

OTHER PUBLICATIONS

International Search Report and Written Opinion in International Application No. PCT/US2015/048652, dated Nov. 2, 2015, 15 pages.
Sean Hargrave, "Apple pay and iBeacons—A Digital marketing Revolution Could Be On Its Way", London Media Advertising Daily, http://www.mediapost.com/publications/article/233982/apple-pay-and-ibeacons-a-digital-marketing-revo.htlm, Sep. 11, 2014, 3 pages.
Zin et al., "Development of Auto-Notification Application for Mobile Device using Geofacing Technique," Journal of Telecommunication, Electronic and Computer Engineering, Jan. 2015, 7:169-174.

\* cited by examiner

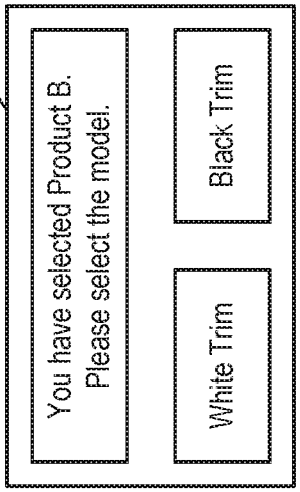
FIG. 6A
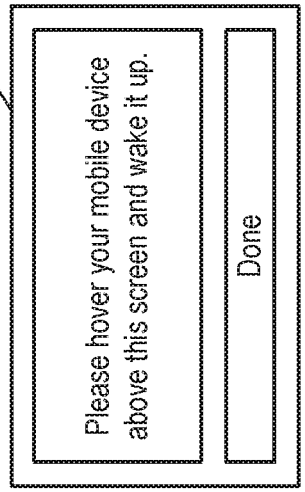
FIG. 6B
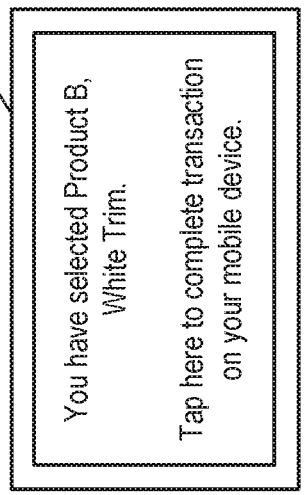
FIG. 6C
FIG. 6D

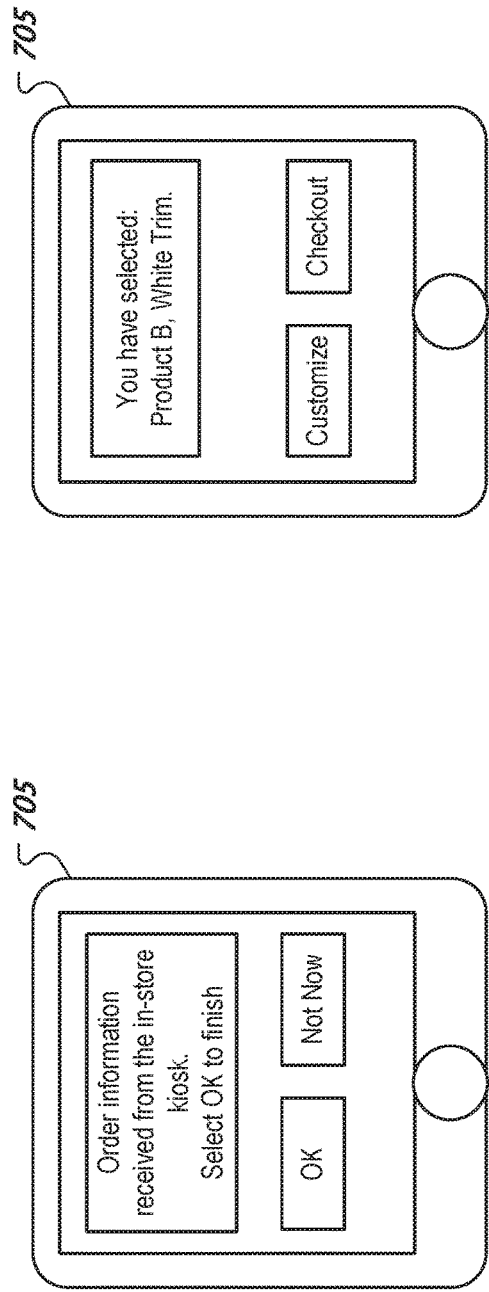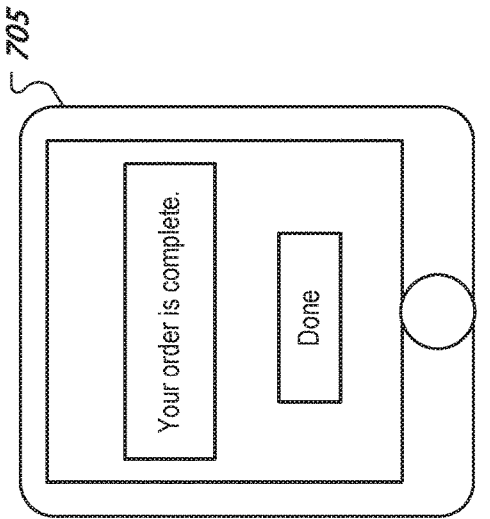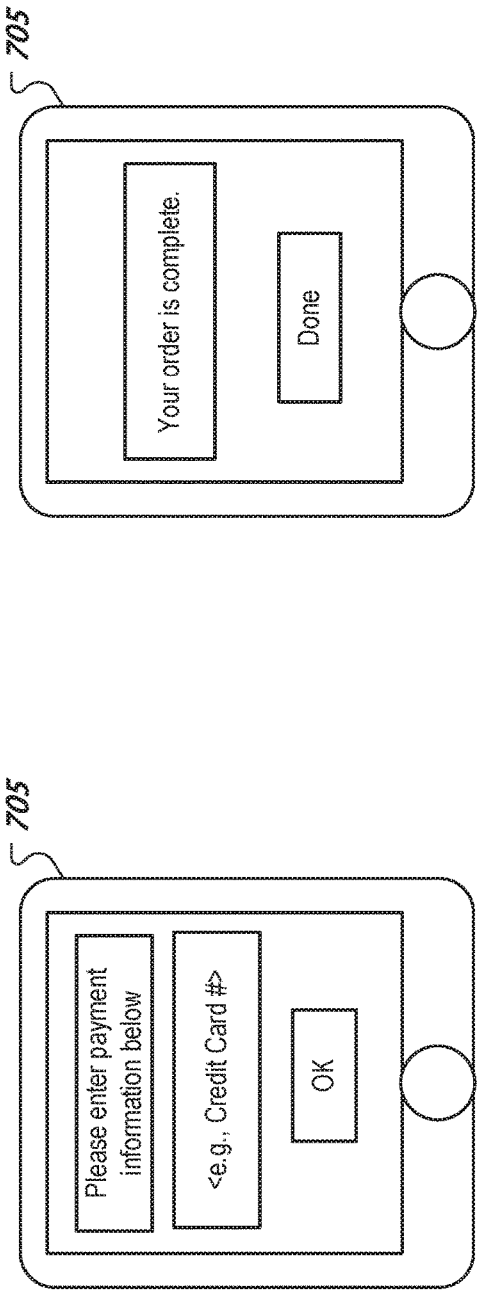

BEACON TRIGGERED DEVICE TO DEVICE CONTENT TRANSFER SYSTEM AND METHOD

CROSS REFERENCE TO RELATED APPLICATION

This application is a division of and claims priority to U.S. patent application Ser. No. 14/586,571, filed Dec. 30, 2014, which claims the benefit of priority of U.S. Provisional Patent Application No. 62/057,612, filed on Sep. 30, 2014, the entire contents of each of which are incorporated in herein by reference.

TECHNICAL FIELD

This disclosure relates generally to radio frequency (RF) beacons.

BACKGROUND

Many modern mobile devices (e.g., a smart phone, tablet computer, wearable computer) include one or more radio frequency receivers, transmitters, or transceivers that allow one-way or two-way communications with other devices. For example, a mobile device can use a transceiver to communicate with a server on the Internet via a base station of a wireless network. In another example, a mobile device can include a receiver to receive low powered RF signals from devices such as RF beacons.

SUMMARY

Techniques and systems for beacon triggered device to device content transfer are disclosed. A beacon-equipped business establishment can include interactive beacon devices that transfer content to a customer's mobile devices by using a beacon message transmitted over a short-range communication link. For example, an interactive beacon device can provide an interactive store catalog and allow a customer to browse the catalog via a touch-screen display. Using the interactive beacon device, the customer can place one or more items in a virtual shopping cart. Rather than having the customer provide sensitive information, such as a physical address, e-mail address, credit card number, into the interactive beacon device, the interactive beacon device can be configured to transmit the content of the virtual shopping cart to the customer's mobile device, and the customer can complete his order using his mobile device. In some implementations, an interactive beacon device can include a beacon device that is configured to transmit a beacon message, which includes the content of the virtual shopping cart or a transaction identifier associated with the virtual shopping cart, over a short-range communication link.

Running on a customer's mobile device, an application for interacting with a beacon-equipped business establishment, including interactive beacon devices, can be configured to receive beacon messages from the establishment and intelligently process them. Reception of a beacon message associated with a customer's virtual shopping cart, for example, can trigger the application to prompt the mobile device user to facilitate a completion of the order on the mobile device. The application can generate order information by prompting the user to verify contents of the virtual shopping cart, customize an item, select a method of payment, select a method of delivery, etc. Based on finalizing the order, the application can transmit the order information to a server that is configured to process the order information for the business establishment.

A technique for beacon triggered device to device content transfer can include presenting, at an interactive beacon device, content including an interactive store catalog; receiving, at the interactive beacon device, user input responsive to the content; generating, at the interactive beacon device, a beacon message that can include transaction information based on the user input and the content, the transaction information including a service or product identifier corresponding to a product or service selected from the interactive store catalog; and transmitting, from the interactive beacon device, the beacon message over a short-range communication link to a mobile device. The beacon message can be configured to cause an application on the mobile device to advance a transaction associated with the transaction information. Other implementations are directed to systems, devices and computer-readable, storage mediums.

These and other implementations can include one or more of the following features. In some implementations, the interactive beacon device includes a touch-sensitive screen. Receiving the user input can include receiving input via the touch-sensitive screen. In some implementations, the beacon message is configured to update a list of products on the mobile device related to the user input and the content. Implementations can treat the transaction information as first transaction information and can include receiving, at a server, second transaction information from the mobile device. The second transaction information can be responsive to the first transaction information and one or more inputs provided by the mobile device. In some implementations, the one or more inputs can include payment information. The transaction information can include a transaction identifier. Presenting the content can include displaying content elements including information about respective products, where the content elements correspond respectively to different beacon message values.

A system for beacon triggered device to device content transfer can include a transmitter configured to transmit beacon messages over a short-range communication link; a screen; and a processor. The processor can be configured to present content via the screen, the content including an interactive store catalog, receive user input responsive to the content, generate a beacon message that can include transaction information based on the user input and the content, the transaction information including a service or product identifier corresponding to a product or service selected from the interactive store catalog, and cause the transmitter to transmit the beacon message over the short-range communication link to a mobile device. The beacon message can be configured to cause an application on the mobile device to advance a transaction associated with the transaction information. In some implementations, the beacon message is configured to cause the application on the mobile device to obtain payment information to fund the transaction. In some implementations, the beacon message is configured to update a list of products on the mobile device related to the user input and the content. In some implementations, the transaction information is treated as first transaction information. The system can include a server configured to receive second transaction information from the mobile device, where the second transaction information is responsive to the first transaction information and one or more inputs provided by the mobile device. In some implementations, the one or more inputs include payment information. The transaction information can include a transaction identifier. In some implementations, the processor is configured to display content elements including information about respective products, where the content elements correspond respectively to different beacon message values.

A system for providing beacon-related applications can include a network interface configured to communicate with mobile devices; and processor electronics configured to store applications, including an application, for download to the mobile devices via the network interface. The application can include instructions to cause a mobile device to perform operations. The operations can include receiving a beacon message from an interactive beacon device over a first communication link, the beacon message including first transaction information; presenting a notification based on the first transaction information; presenting one or more product or service descriptions corresponding to one or more identifiers associated with the first transaction information; obtaining payment information; generating second transaction information based on the one or more identifiers and the payment information; and transmitting the second transaction information to a server over a second communication link, where the first communication link and the second communication link are different. In some implementations, the first transaction information can include the one or more identifiers. In some implementations, the application is configured to obtain the one or more product or service descriptions from a server. In some implementations, the first transaction information can include a transaction identifier. In some implementations, the application is configured to obtain the one or more identifiers from a server based on the transaction identifier. In some implementations, the second transaction information is encrypted based on a public key associated with the server. In some implementations, the payment information can include a credit card number. In some implementations, the payment information can include a user account identifier associated with a user account that has a charging capability. In some implementations, the first communication link is a short-range communication link, and the second communication link is a long-range communication link.

Particular implementations disclosed herein provide one or more of the following advantages. Business establishments can use device to device content transfer to quickly convey product and/or service information to a customer. Business establishments can use device to device content transfer to pass transaction information to a customer to expedite a check-out process. Starting a transaction on a public device, such as an interactive beacon device, and transferring the transaction to a private device, e.g., mobile device, can alleviate the security concerns of a customer that would be hesitant to provide sensitive information such as a credit card number to a publicly accessible device.

The details of the disclosed implementations are set forth in the accompanying drawings and the description below. Other features, objects and advantages are apparent from the description, drawings and claims.

DESCRIPTION OF DRAWINGS

FIGS. 6A, 6B, 6C, and 6D illustrate example screenshots of a screen of an interactive beacon device associated with a beacon triggered device to device content transfer.

FIGS. 7A, 7B, 7C, and 7D illustrate example screenshots of a screen of a mobile device associated with a beacon triggered device to device content transfer.

The same reference symbol used in various drawings indicates like elements.

DETAILED DESCRIPTION

Figure 1:
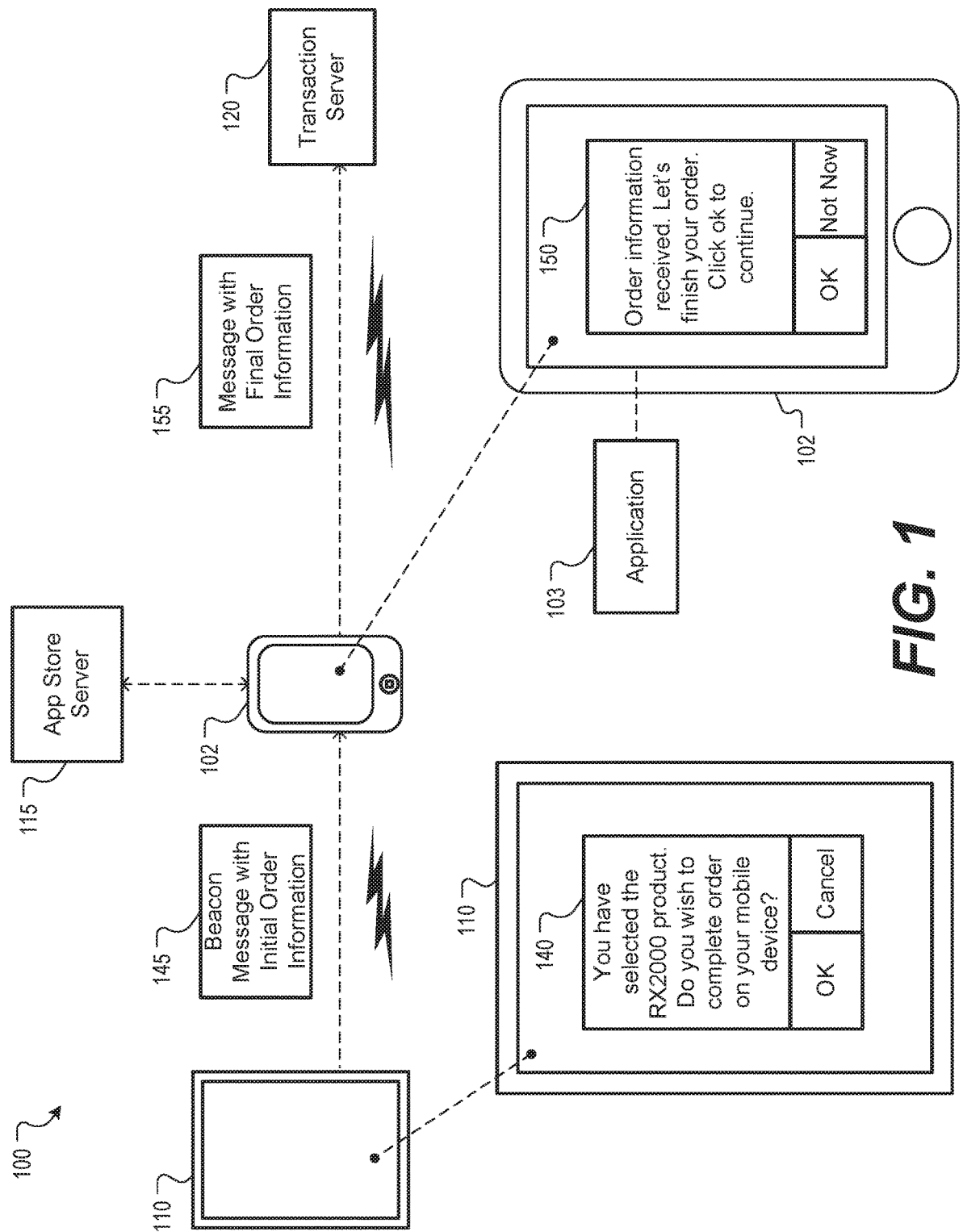
FIG. 1 is a plan view of an example operating environment for a beacon triggered device to device content transfer.

FIG. 1 is a plan view of an example operating environment 100 for a beacon triggered device to device content transfer. In the example shown, operating environment 100 can be a business establishment, such as a retail store, museum, sports arena, restaurant, service provider, or any other environment which includes at least one interactive beacon device 110. The interactive beacon device 110 can be configured to provide an interactive experience to customers of the business establishment. For example, the interactive beacon device 110 can include a touch sensitive display and can be configured to display an interactive catalog via the touch sensitive display. A customer can use the interactive beacon device 110 to select one or more products and/or services from the interactive catalog. After selection, the interactive beacon device 110 can display a window 140 containing information about the selected product and/or service, and prompt the customer to complete the order on the customer's mobile device 102. If the customer selects an "OK" virtual button associated with window 140, the interactive beacon device 110 can generate a beacon message 145 containing initial order information. The interactive beacon device 110 can transmit the beacon message 145 to the mobile device 102 over a short-range communication link. In some implementations, initial order information within the beacon message 145 can include one or more product identifiers associated with one or more selected products. In some implementations, the beacon message 145 can include a transaction identifier that corresponds to the initial order information rather than a list of one or more product identifiers. For example, the interactive beacon device 110 can exchange one or more messages with a transaction server 120 to associate a transaction identifier with one or more selected products or services at the transaction server 120.

A reception of the beacon message 145 by the mobile device 102 can trigger an application 103 running on the mobile device 102 to handle the initial order information included in the beacon message 145. The application 103 can extract the initial order information from the beacon message 145. In some implementations, the application 103 extracts a transaction identifier from the beacon message 145, and retrieves the initial order information from the transaction server 120.

The application 103 can cause the mobile device 102 to display a window 150 stating that the initial order information has been received and prompt the customer to complete the order. In some implementations, the window 150 can include an image of a selected product and/or service. The application 103 can perform one or more functions to complete the order. Such functions can include prompting the user to verify contents of a virtual shopping cart, customizing an item, selecting a method of payment, selecting a method of delivery, or a combination thereof. Other types of functions are possible. The application 103 can generate a message 155 that includes the final order information. Further, the application 103 can cause the mobile device 102 to transmit the message 155 to a transaction server 120. The transaction server 120 can process the message 155 to fulfill the order. In some implementations, the application 103 can be downloaded from an application store server 115.

Devices such as the interactive beacon device 110 and the mobile device 102 can use a short-range radio technology such as Bluetooth™ or a near field communication (NFC) technology for transmitting and/or receiving beacon messages. In some implementations, the interactive beacon device 110 can use a specific type of Bluetooth™ called Bluetooth™ low energy (BLE) to transmit a beacon message. A wireless communication range of the interactive beacon device 110 can be between 1 to 30 centimeters. Other ranges are possible.

Various examples of a mobile device 102 include smartphones, tablet computers, notebook computers, or wearable computers. In some implementations, the mobile device 102 can include a wireless receiver or transceiver that can scan the environment 100 for beacon messages from other devices, such as interactive beacon device 110, in the environment 100. For example, a mobile device 102 can include a BLE receiver that scans for beacon messages. Over a long-range communication link, the mobile device 102 can communicate with servers through a base station of a wireless network such as one based on Long Term Evolution (LTE), Code Division Multiple Access (CDMA), e.g., CDMA2000 and Wideband CDMA (WCDMA), or an IEEE 802.11 wireless standard. Other types of wireless networks are possible.

An interactive beacon device 110 can be mounted on a wall, table, or free standing kiosk. Other types of mounts are possible. Various examples of an interactive beacon device 110 include touch-enabled display devices, tablet computers, notebook computers, or smartphones. The interactive beacon device 110 can include a wireless transmitter that can transmit beacon messages to other devices, such as mobile device 102, in the environment 100. For example, an interactive beacon device 110 can include a BLE transmitter that transmits beacon messages. In some implementations, over a long-range communication link, an interactive beacon device 110 can communicate with one or more servers through a base station of a wireless network such as one based on Long Term Evolution (LTE), Code Division Multiple Access (CDMA), e.g., CDMA2000 and Wideband CDMA (WCDMA), or an IEEE 802.11 wireless standard. Other types of wireless networks are possible. In some implementations, an interactive beacon device 110 can communicate with one or more servers over a wireline such as Ethernet or coax.

In some implementations, application 103 can be referred to as a retail store application. The application 103 can be configured to process beacon messages including one or more beacon messages 145 from interactive beacon device 110 and offer appropriate actions such as completing a transaction, displaying information about the transaction, or both. In some implementations, the interactive beacon device 110 can transmit a beacon message over BLE to initiate an alert on application 103 that is relevant to content being displayed on a screen of the interactive beacon device 110. In some implementations, the interactive beacon device 110 can transmit a beacon message over BLE to pass a product identifier, e.g., unique part number, that corresponds to a product being displayed by device 110 to application 103. The application 103 can receive the beacon message, and extract and add the unique part number to a wish list or cart. In some implementations, the application 103 can prompt the mobile device user whether to add the unique part number to a wish list or add the unique part number to a virtual shopping cart. In some implementations, the interactive beacon device 110 can transmit a beacon message over BLE to pass a link to a brochure such that the application 103 can use the link to download the brochure from the Internet and display the brochure to the mobile device user.

In some implementations, the interactive beacon device 110 can transmit a beacon message 145 over BLE to pass a product identifier, where the beacon message is configured to evoke a self-checkout feature of the application 103. In some implementations, the application 103 can be logged into a user account that has a charging feature. For example, a user can configure his user account with payment information such that he does not have to enter sensitive information such as a credit card number for each transaction. In this case, the application 103 can ask for permission to use the payment information that is already "on file" to complete the transaction at the mobile device 102. In some implementations, the application 103 can prompt the mobile device user to determine whether the user desires to customize a product or service associated with the beacon message 145.

Figure 2:
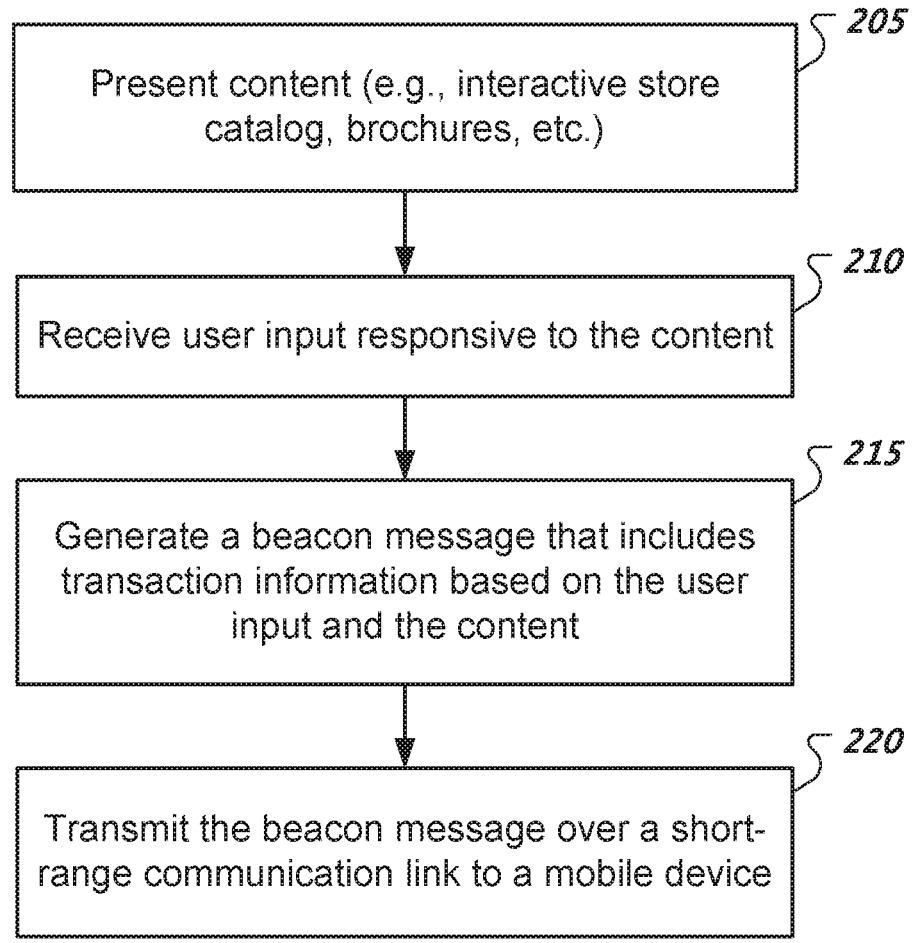
FIG. 2 illustrates an example process performed by an interactive beacon device associated with a beacon triggered device to device content transfer.

FIG. 2 illustrates an example process 200 performed by an interactive beacon device associated with a beacon triggered device to device content transfer. In some implementations, the process 200 can begin by presenting content (205). In some implementations, an interactive beacon device can be configured to present content such as an interactive store catalog, brochures, or a combination thereof. Presenting content can include displaying one or more content elements that correspond to one or more products. Content elements can include images, text, video, audio, or a combination thereof. Further, content elements can include mechanisms such as virtual buttons to select and/or manipulate content being displayed.

The process 200 can include receiving user input responsive to the content (210). In some implementations, receiving user input can include accessing coordinates generated by a touch-sensitive display in response to a physical interaction with the display. In some implementations, receiving user input can include accessing a video feed of a user in front of the interactive beacon device and processing a gesture made by the user that corresponds to a selection of a content element being displayed by the device.

The process 200 can include generating a beacon message that includes transaction information based on the user input and the content (215). In some implementations, the transaction information can include one or more product identifiers corresponding to one or more products selected from an interactive store catalog. In some implementations, user input can include two or more inputs corresponding to two or more selections of products being displayed by the interactive beacon device. For example, the interactive beacon device can maintain a virtual shopping cart for a customer based on the customer's selections of products within the interactive store catalog.

The process 200 can include transmitting the beacon message over a short-range communication link to a mobile device (220). In some implementations, the beacon message can be configured to cause an application on the mobile device to advance a transaction associated with the transaction information. For example, the beacon message can be configured to cause the application on the mobile device to obtain payment information to fund the transaction.

Figure 3A:
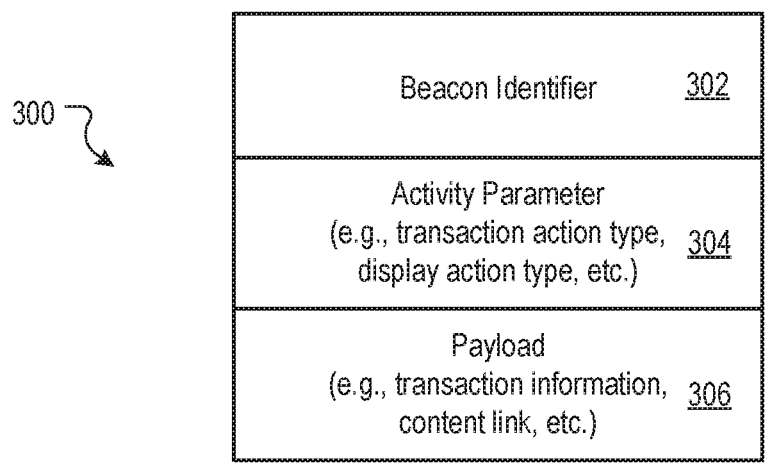
FIGS. 3A, 3B, and 3C illustrate different examples of beacon message formats.
Figure 3B:
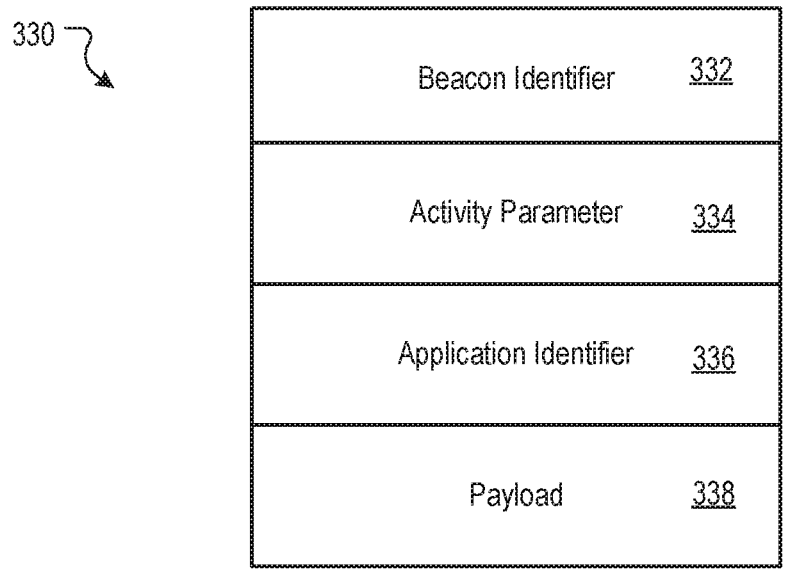
Figure 3C:
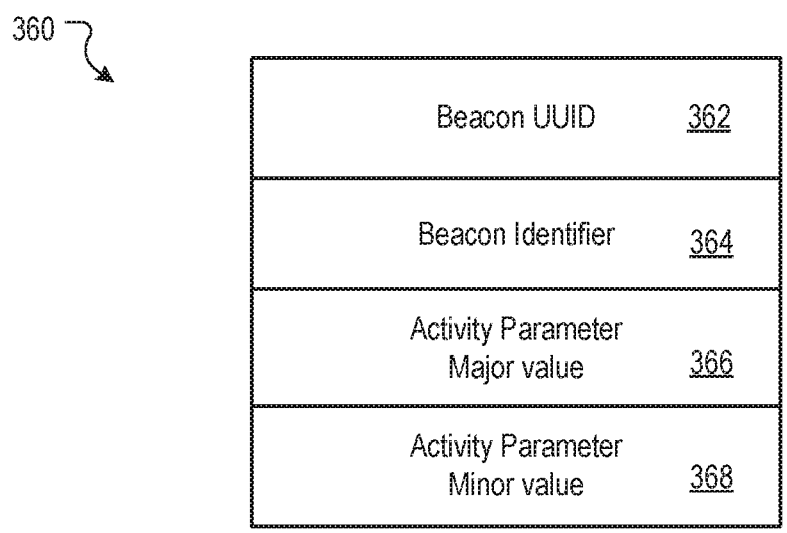

FIGS. 3A, 3B, and 3C illustrate different examples of beacon message formats. In FIG. 3A, the format 300 includes a beacon identifier 302, an activity parameter 304, and a payload 306. A beacon identifier 302 can include a text string such as "store_no_5954" or a hexadecimal value such as "0x0e53de54." Other types of identifiers are possible. In some implementations, the activity parameter 304 can include an action value or string. In some implementations, the activity parameter 304 can include a message value or string. Other types of activity parameters are possible. In some implementations, the payload 306 can include transaction information. In some implementations, the payload 306 can include a content link. A content link can include a uniform resource locator (URL). In some implementations, the activity parameter 304 can specify a "complete transaction" action type to cause a receiver of the beacon message to trigger a process within an application to complete a transaction identified by transaction information included in the payload parameter 306. In some implementations, the activity parameter 304 and the payload 306 are merged together.

In FIG. 3B, the format 330 includes a beacon identifier 332, activity parameter 334, application identifier 336, and a payload 338. The application identifier 336 can identify an application running on the mobile device for handling the beacon message upon reception at a mobile device. For example, an operating system running on the mobile device can use the application identifier 336 to forward the beacon message to an application corresponding to the application identifier 336. In some implementations, if the application is not already installed on the mobile device, a browser can be launched on the mobile device and direct the user, e.g., using a URL, to a website where the user can download and install the application corresponding to the application identifier 336. In some implementations, the application can be downloaded automatically without user intervention in a manner that is transparent to the user (e.g., as a background process). In some implementations, if the application is installed but not running on the mobile device, the application can be launched automatically by the operating system running on the mobile device to receive the beacon message. The payload 338 can include transaction information such as a link to a product description webpage, product identifier, transaction identifier, or a combination thereof.

In FIG. 3C, the format 360 includes a beacon universally unique identifier (UUID) 362, beacon identifier 364, activity parameter major value 366, and activity parameter minor value 368. A venue can include multiple beacon devices having the same beacon identifier 364. However, such beacons can have different values for the beacon UUID 362. Thus, the beacon UUID 362 can serve to differentiate among beacon devices sharing the same beacon identifier 364. In some implementations, the beacon identifier 364 includes the beacon UUID 362. In some implementations, the UUID 362 is a 128-bit value.

An activity parameter can be split between a major value 366 and a minor value 368. In some implementations, the major value 366 and a minor value 368 are different 16-bit portions of a 32-bit value. In some implementations, the minor value 368 specifies a subtype from a group associated with the major value 366. For example, the major value 366 can specify a value associated with a "complete transaction" action type. In some implementations, the minor value 368 can specify transaction information such as a link to a product description webpage, product identifier, transaction identifier, or a combination thereof. In some implementations, an optional payload field (not shown) can specify transaction information such as a link to a product description webpage, product identifier, transaction identifier, or a combination thereof.

In some implementations, an application running on a mobile device can process the major value 366 and the minor value 368 based on an internal database that associates major and minor values with specific actions. In some implementations, the internal database includes information from a JavaScript Object Notation (JSON) based file or data stream containing attribute—value pairs, e.g., one or more records containing a beacon identifier, major value, minor value, and an action-response such as a text string for displaying to a user. For example, a JSON based file can include the following text:

```
{
    "beaconUUID": "B3F56DB5-EFFB-58D2-C060-C0F5F81096E5",
    "beaconIdentifier": "com.retailstore_no_3954",
    "beacons": [{
        "major": 1,
        "minor": 99,
        "action": "message",
        "url": "",
        "message": {
            "en": "Welcome to the Store!"}
    }, {
        "major": 3,
        "minor": 22354537,
        "action": "complete transaction",
        "url": "http://mystore/product-RX2000",
        "message": {
            "en": "Received your order! Click on OK to complete and pay for order"}
    }]
}
```

This example JSON file snippet includes different actions associated with different major and minor values for a beacon UUID and identifier pair. Based on receiving a major and minor value from the beacon device associated with the beacon UUID and identifier pair, a mobile device would perform the action associated with the corresponding major and minor value entry within the JSON file. In some implementations, a minor value can specify a product identifier, and a JSON file on a mobile device can be used to extract a URL that corresponds to the product identifier in order to provide information about the product associated with the product identifier on the mobile device or use the URL to order the product.

Figure 4:
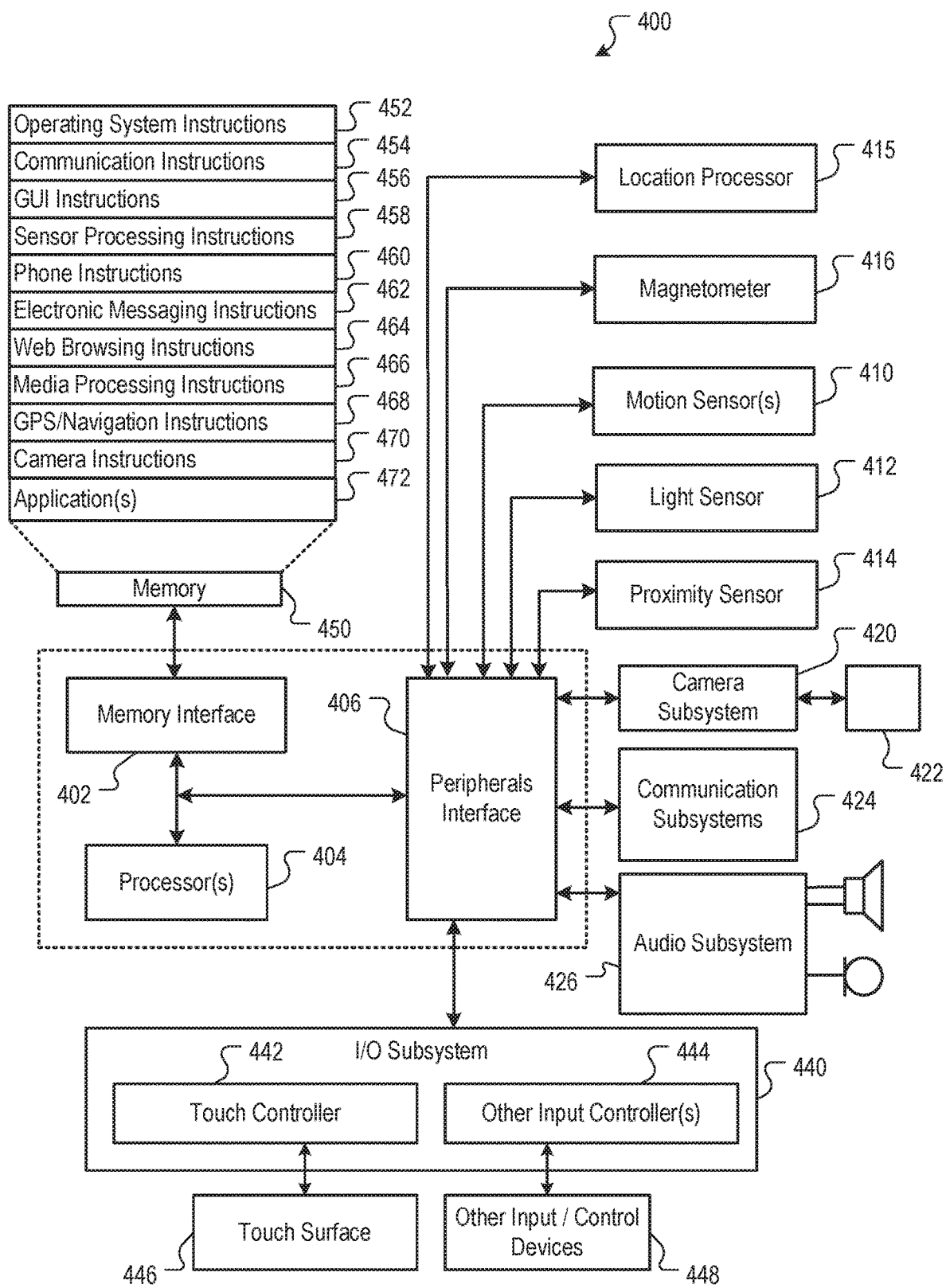
FIG. 4 is a block diagram of example device architecture.

FIG. 4 is a block diagram of example device architecture. The architecture may be implemented in device 400 for generating the one or more of the features described in this specification, including but not limited to portable computers, smart phones and electronic tablets, game consoles, wearable devices and the like. Device 400 may include memory interface 402, data processor(s), image processor(s) or central processor(s) 404, and peripherals interface 406. Memory interface 402, processor(s) 404 or peripherals interface 406 may be separate components or may be integrated in one or more integrated circuits. One or more communication buses or signal lines may couple the various components.

Sensors, devices, and subsystems may be coupled to peripherals interface 406 to facilitate multiple functionalities. For example, motion sensor 410, light sensor 412, and proximity sensor 414 may be coupled to peripherals interface 406 to facilitate orientation, lighting, and proximity functions of the device. For example, in some implementations, light sensor 412 may be utilized to facilitate adjusting the brightness of touch surface 446. In some implementations, motion sensor 410 (e.g., an accelerometer, gyros) may be utilized to detect movement and orientation of the device. Accordingly, display objects or media may be presented according to a detected orientation (e.g., portrait or landscape). Other sensors may also be connected to peripherals interface 406, such as a temperature sensor, a biometric sensor, or other sensing device, to facilitate related functionalities. Location processor 415 (e.g., GPS receiver chip) may be connected to peripherals interface 406 to provide geo-positioning. Electronic magnetometer 416 (e.g., an integrated circuit chip) may also be connected to peripherals interface 406 to provide data that may be used to determine the direction of magnetic North. Thus, electronic magnetometer 416 may be used as an electronic compass. Camera subsystem 420 and an optical sensor 422, e.g., a charged coupled device (CCD) or a complementary metal-oxide semiconductor (CMOS) optical sensor, may be utilized to facilitate camera functions, such as recording photographs and video clips. Audio subsystem 426 may be coupled to a speaker 428 and one or more microphones 430 to facilitate voice-enabled functions, such as voice recognition, voice replication, digital recording, and telephony functions.

Communication functions may be facilitated through one or more communication subsystems 424. Communication subsystems 424 may include one or more wireless communication subsystems. Wireless communication subsystems may include radio frequency receivers and transmitters and/or optical (e.g., infrared) receivers and transmitters. Wired communication system may include a port device, e.g., a Universal Serial Bus (USB) port or some other wired port connection that may be used to establish a wired connection to other computing devices, such as other communication devices, network access devices, a personal computer, a printer, a display screen, or other processing devices capable of receiving or transmitting data.

The specific design and implementation of the communication subsystems 424 may depend on the communication network(s) or medium(s) over which the device 400 is intended to operate. For example, a device may include wireless communication subsystems designed to operate over LTE, GSM, a GPRS network, an enhanced data GSM environment (EDGE) network, IEEE 802.11 communication networks (e.g., Wi-Fi), CDMA networks, NFC and a Bluetooth™ network. Communication subsystems 424 may include hosting protocols such that the device may be configured as a base station for other wireless devices. As another example, the communication subsystems may allow the device to synchronize with a host device using one or more protocols, such as, for example, the TCP/IP protocol, HTTP protocol, UDP protocol, and any other known protocol.

I/O subsystem 440 may include touch controller 442 and/or other input controller(s) 444. Touch controller 442 may be coupled to a touch surface 446. Touch surface 446 and touch controller 442 may, for example, detect contact and movement or break thereof using any of a number of touch sensitivity technologies, including but not limited to capacitive, resistive, infrared, and surface acoustic wave technologies, as well as other proximity sensor arrays or other elements for determining one or more points of contact with touch surface 446. In one implementation, touch surface 446 may display virtual or soft buttons and a virtual keyboard, which may be used as an input/output device by the user.

Other input controller(s) 444 may be coupled to other input/control devices 448, such as one or more buttons, rocker switches, thumb-wheel, infrared port, USB port, and/or a pointer device such as a stylus. The one or more buttons (not shown) may include an up/down button for volume control of speaker 428 and/or microphone 430.

In some implementations, device 400 may present recorded audio and/or video files, such as MP3, AAC, and MPEG video files. In some implementations, device 400 may include the functionality of an MP3 player and may include a pin connector for tethering to other devices. Other input/output and control devices may be used.

Memory interface 402 may be coupled to memory 450. Memory 450 may include high-speed random access memory or non-volatile memory, such as one or more magnetic disk storage devices, one or more optical storage devices, or flash memory (e.g., NAND, NOR). Memory 450 may store operating system 452, such as Darwin, RTXC, LINUX, UNIX, OS X, WINDOWS, or an embedded operating system such as VxWorks. Operating system 452 may include instructions for handling basic system services and for performing hardware dependent tasks. In some implementations, operating system 452 may include a kernel (e.g., UNIX kernel).

Memory 450 may also store communication instructions 454 to facilitate communicating with one or more additional devices. Communication instructions 454 may also be used to select an operational mode or communication medium for use by the device, based on a geographic location (obtained by the GPS/Navigation instructions 468) of the device. Memory 450 may include graphical user interface instructions 456 to facilitate graphic user interface processing, including a touch model for interpreting touch inputs and gestures; sensor processing instructions 458 to facilitate sensor-related processing and functions; phone instructions 460 to facilitate phone-related processes and functions; electronic messaging instructions 462 to facilitate electronic-messaging related processes and functions; web browsing instructions 464 to facilitate web browsing-related processes and functions; media processing instructions 466 to facilitate media processing-related processes and functions; GPS/Navigation instructions 468 to facilitate GPS and navigation-related processes; camera instructions 470 to facilitate camera-related processes and functions; and application storage 472 for storing one more applications.

In some implementations, a mobile device can be based on the architecture of device 400. In some implementations, the application storage 472 can store one or more applications such as a retail store application that is configured to receive beacon messages, and perform actions specified by the beacon messages. In some implementations, such applications can be pre-installed on the device 400, downloaded from an application store server, or a combination thereof. The retail store application can include a rules-based engine that processes beacon messages according to one or more rule sets.

In some implementations, an interactive beacon device can be based on the architecture of device 400. In some implementations, the application storage 472 can store an application configured to provide content such as an interactive store catalog and transfer information to another device via a short-range communication link provided via the communication subsystems 424.

Each of the above identified instructions and applications may correspond to a set of instructions for performing one or more functions described above. These instructions need not be implemented as separate software programs, procedures, or modules. Memory 450 may include additional instructions or fewer instructions. Furthermore, various functions of the device may be implemented in hardware and/or in software, including in one or more signal processing and/or application specific integrated circuits (ASICs).

Figure 5:
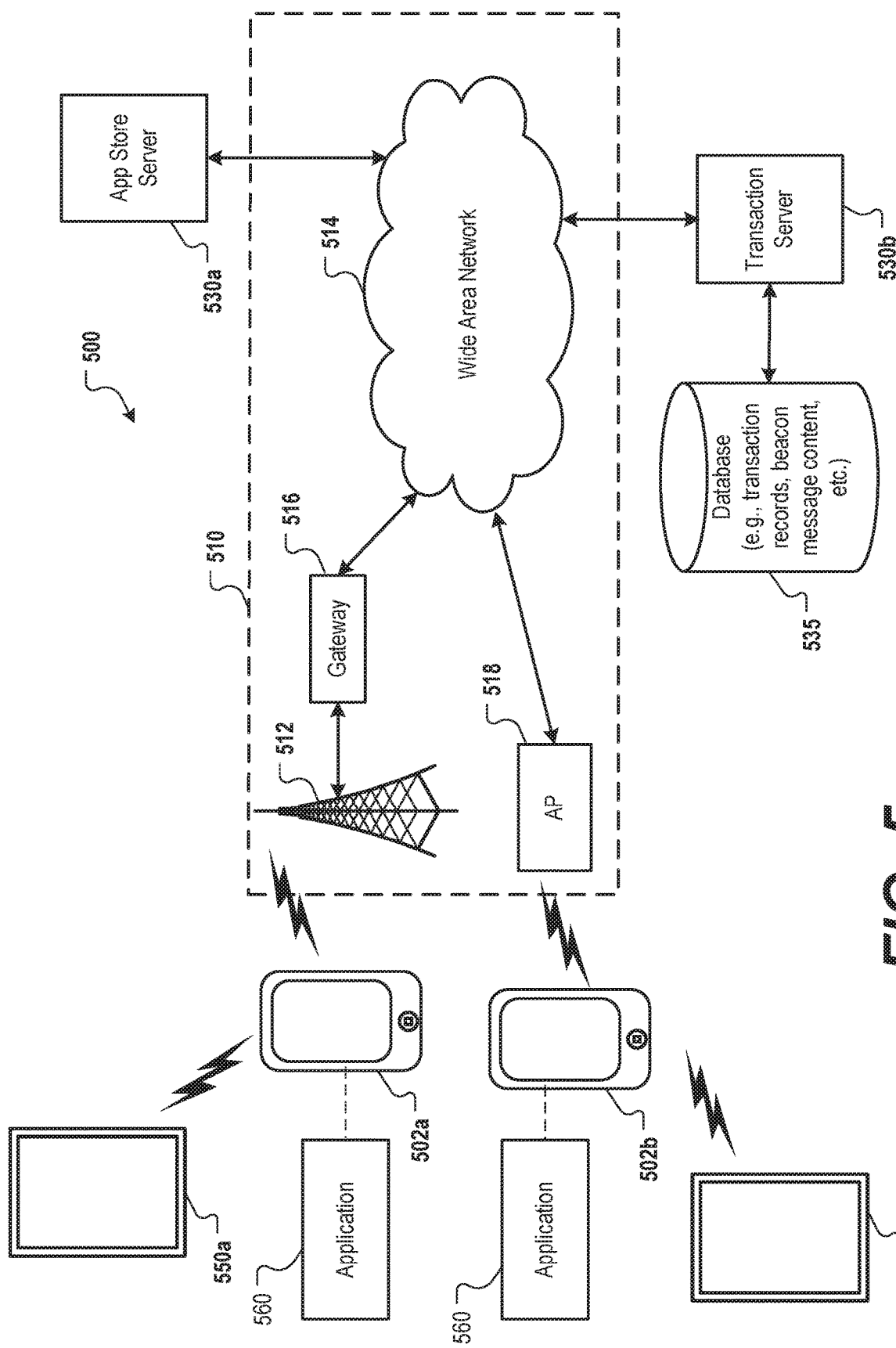
FIG. 5 illustrates an example operating environment for a beacon triggered message exchange.

FIG. 5 illustrates an example operating environment 500 for a beacon triggered message exchange. Mobile devices 502*a-b*, for example, can communicate over one or more wireless networks with one or more devices, e.g., servers 530*a-b*, that can be associated with a business establishment of the operating environment 500. For example, a base station 512 of a wireless network, e.g., a cellular network, can communicate with a wide area network (WAN) 514, such as the Internet, by use of a gateway 516. Likewise, an access point (AP) 518, such as an IEEE 802.11 family based wireless access point, can provide communication access to the wide area network 514. The mobile device 502*a-b* can, for example, communicate with one or more servers 530*a-b* via the base station 512, access point 518, or combination thereof.

Mobile devices 502*a-b* can receive beacon messages over a short-range communication link from respective interactive beacon devices 550*a-b*. The interactive beacon devices 550*a-b* can transmit customized beacon messages based on a selection of content presented by the interactive beacon devices 550*a-b*. In some implementations, the short-range communication link can be based on BLE radio technology. In some implementations, the short-range communication link can be based on NFC radio technology. In some implementations, the mobile devices 502*a-b* can be configured to continuously scan for beacon messages. In some implementations, the mobile devices 502*a-b* can be configured to scan for beacon messages for a predetermined time period based on an application 560 invoking a beacon scan API.

In some implementations, based on receiving a beacon message over a short-range communication link from an interactive beacon device 550*a-b*, a mobile device 502*a-b* can establish communication with one or more servers 530*a-b* via a long-range communication link associated with a base station 512 that provides cellular data services. For example, a beacon message from an interactive beacon device 550*a-b* can cause the mobile devices 502*a-b* to retrieve a retail store application 560 from an application store ("app store") server 530*a*. In some implementations, the mobile devices 502*a-b* have already retrieved and are running the retail store application 560 before receiving the beacon message from an interactive beacon device 550*a-b*. A retail store application 560 can be configured to download beacon message content from a transaction server 530*b*. In some implementations, a retail store application 560 can download beacon message content from the transaction server 530*b* in response to an initial reception of a beacon message such as a welcome beacon message.

In some implementations, the transaction server 530*b* can store data such as beacon message content in a database 535. In some implementations, beacon message content includes mappings between beacon message values (e.g., identifier, major, and/or minor values) and corresponding message data (e.g., text, picture, video, and/or audio). After downloading the beacon message content from the transaction server 530*b*, the mobile devices 502*a-b* can use the mappings and message texts to translate a received beacon message into a format that is suitable for display to users of the mobile devices 502*a-b*. In some implementations, beacon message content can be stored as a document within the database 535 such as an Extensible Markup Language (XML) document or a JSON document. Other document types are possible. In some implementations, the transaction server 530*b* provides the entire beacon message content document to the mobile devices 502*a-b*.

The transaction server 530*b* can store data such as transaction records in a database 535. In some implementations, a transaction record can include information such as a user identifier, transaction identifier, product identifier, service identifier, appointment information, payment status, package identifier, fulfillment type (e.g., overnight shipping, ground shipping, in-store pick-up, in-store service appoint, etc.), or a combination thereof.

In some implementations, user interaction with an interactive beacon device 550*a-b* and subsequent selection of a product or service can cause a beacon message that corresponds to a transaction started at the interactive beacon device 550*a-b* to be generated and transmitted. After the interactive beacon device 550*a-b* provides initial transaction information to a retail store application 560 on a mobile device 502*a-b* via a beacon message, the retail store application 560 can collect additional information, such as payment information, to finalize the transaction on the customer-side. The retail store application 560 can provide transaction information including the additional information to the transaction server 530*b* in order to establish a transaction record in database 535.

In some implementations, user interaction with an interactive beacon device 550*a-b* and subsequent selection of a product or service can (i) cause an initial version of a transaction record in database 525 to be created and (ii) cause a beacon message that corresponds to the transaction record to be transmitted. The interactive beacon device 550*a-b*, for example, can send a message to transaction server 530*b* that includes information about a transaction started at the interactive beacon device 550*a-b*. After the interactive beacon device 550*a-b* provides initial transaction information to a retail store application 560 on a mobile device 502*a-b* via a beacon message, the retail store application 560 can collect additional information, such as payment information. The retail store application 560 can provide additional information to the transaction server 530*b* in order to finalize the transaction record.

In some implementations, interactive beacon devices 550*a-b* can include circuitry such as a processor, memory, transmitter for transmitting beacon messages, and an interface for programming the interactive beacon devices 550*a-b*, which can be a USB interface or a two-way wireless interface such as an LTE or IEEE 802.11 based network interface. In some implementations, servers 530*a-b* can include a network interface configured to communicate with devices such as the mobile devices 502*a-b* and the notification device 540. The servers 530*a-b* can include processor electronics configured to communicate with devices such as the mobile devices 502*a-b* via the network interface using a protocol such as Transmission Control Protocol/Internet Protocol (TCP/IP) or User Datagram Protocol (UDP).

FIGS. 6A, 6B, 6C, and 6D illustrate example screenshots of a screen of an interactive beacon device 605 associated with a beacon triggered device to device content transfer. As depicted by FIG. 6A, the interactive beacon device 605 can display content such as content elements on a screen. In this example, content elements correspond to products in an interactive store catalog. The interactive beacon device 605 can be configured to accept user input that selects a content element. For example, a user can press on a touch-sensitive area associated with a content element of a desired product; the press can generate a user input and the interactive beacon device 605 can determine a selected content element, e.g., a selected product, based on the user input. After determining the selected product, the interactive beacon device 605 can be configured to display product information associated with the selected product. As depicted by FIG. 6B, the product information can include display boxes for selecting product options, e.g., color. After obtaining a selection of a product option, the interactive beacon device 605 can be configured to display information about the selected product and/or display information about one or more options associated with the selected product, which is depicted by FIG. 6C. Further, as depicted by FIG. 6C, the interactive beacon device 605 can solicit user input, e.g., acceptance, for completing the transaction on the user's mobile device. After user acceptance, the interactive beacon device 605 can display instructions for transferring the transaction to the user's mobile device (e.g., "please hover your mobile device above this screen and wake it up"), which is depicted by FIG. 6D. During the display depicted by FIG. 6D, the interactive beacon device 605 can commence transmission of a beacon message that includes transaction information associated with the selected product and/or options.

FIGS. 7A, 7B, 7C, and 7D illustrate example screenshots of a screen of a mobile device 705 associated with a beacon triggered device to device content transfer. A beacon message that includes transaction information associated with a selected product can be received from an interactive beacon device at the mobile device 705. As depicted by FIG. 7*a*, the mobile device 705 can display a window indicating that the order information has been received and can prompt the mobile device user to finish the transaction on the mobile device 705. As depicted by FIG. 7B, information about the transaction can be displayed. Further, the mobile device 705 can provide an option to customize the product (e.g., engraving and/or other customizations). As depicted by FIG. 7C, the mobile device 705 can obtain payment information, such as a credit card number, via a text box displayed on the screen of the mobile device 705. In some implementations, rather than requiring a credit card number to be entered, the mobile device 705 can prompt the mobile device user whether to use a previously entered and stored credit card number. In some implementations, the mobile device 705 can prompt the mobile device user whether to use payment information associated with a user account. Based on exchanging one or more messages with a transaction server, the mobile device 705 can display a confirmation that the order is complete, which is depicted by FIG. 7D.

Figure 8:
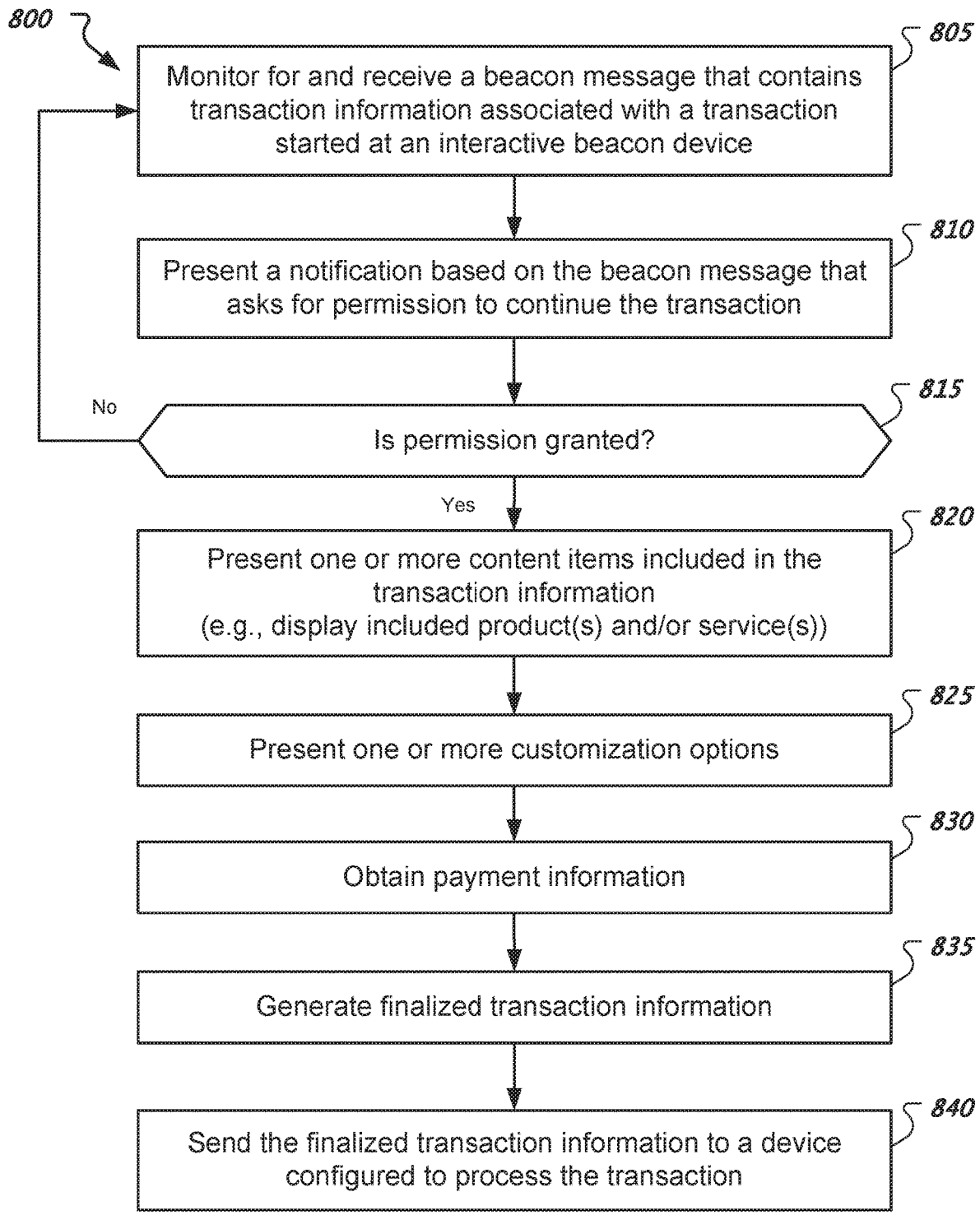
FIG. 8 illustrates an example process performed by a mobile device associated with a beacon triggered device to device content transfer.

FIG. 8 illustrates an example process performed by a mobile device associated with a beacon triggered device to device content transfer. The process 800 monitors for and receives a beacon message that contains transaction information associated with a transaction started at an interactive beacon device (805). Receiving a beacon message can include receiving a beacon message through an application running on the mobile device. The process 800 presents a notification based on the beacon message that asks for permission to continue the transaction (810). Presenting the notification can include causing a force feedback (e.g., vibration indication), playing audio (e.g., beep, music, etc.), causing a visual indication (e.g., message display, flashing light), or a combination thereof. The process 800 determines whether permission is granted (815). In some implementations, determining whether permission is granted includes determining whether a user selected a virtual button that corresponds to an acceptance (e.g., a virtual button labeled "Press here to continue with transaction"). If permission is not granted, then the process 800 continues to monitor for and receive another beacon message (805). If permission is granted, then the process 800 presents one or more content items included in the transaction information (820). Presenting one or more content items can include displaying one or more products and/or services. Displaying one or more products and/or services can include displaying an image of a product/service, description of a product/service, or a combination thereof. In some implementations, the process 800 can retrieve one or more content items from a server. For example, the process 800 can extract a URL included in the transaction information, and obtain product images and/or descriptions from a server associated with the extracted URL.

The process 800 presents one or more customization options (825). Presenting one or more customization options can include displaying a user selection box to select one or more additional options associated with the product. The process 800 obtains payment information (830). In some implementations, obtaining payment information can include prompting a mobile device user to enter a credit card number via a text entry box. In some implementations, obtaining payment information can include prompting a mobile device user for permission to use payment information that is already "on file" in a user account. The process 800 generates finalized transaction information (835). The process 800 sends the finalized transaction information to a device configured to process the transaction such as a transaction server (840). In some implementations, finalized transaction information includes a user account identifier and one or more product identifiers. In some implementations, finalized transaction information includes payment information and one or more product identifiers. The finalized transaction information can be encrypted using a public key associated with a transaction server. In some implementations, beacon messages can be received over a first communication link such as a short-range communication link and the finalized transaction information can be transmitted over a second, different communication link such as a long-range communication link.

Figure 9A:
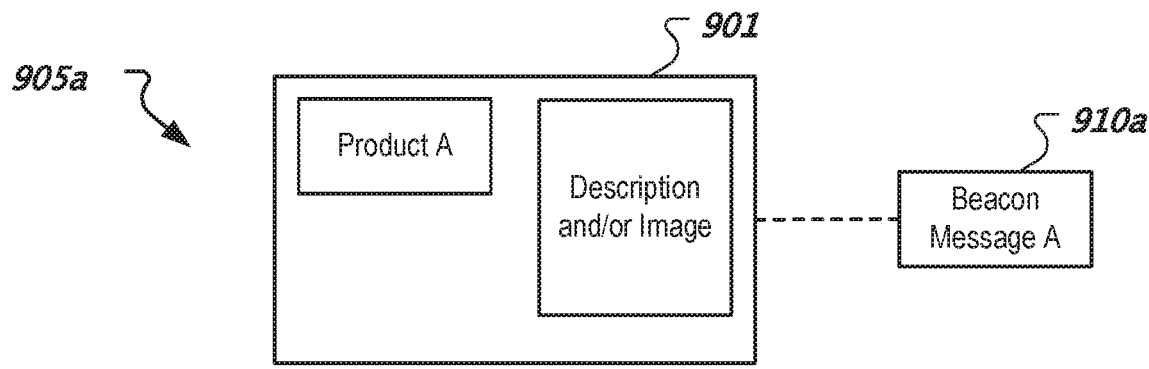
FIGS. 9A, 9B, and 9C illustrate example screenshots of a screen of an interactive beacon device configured to cycle through content elements.
Figure 9B:
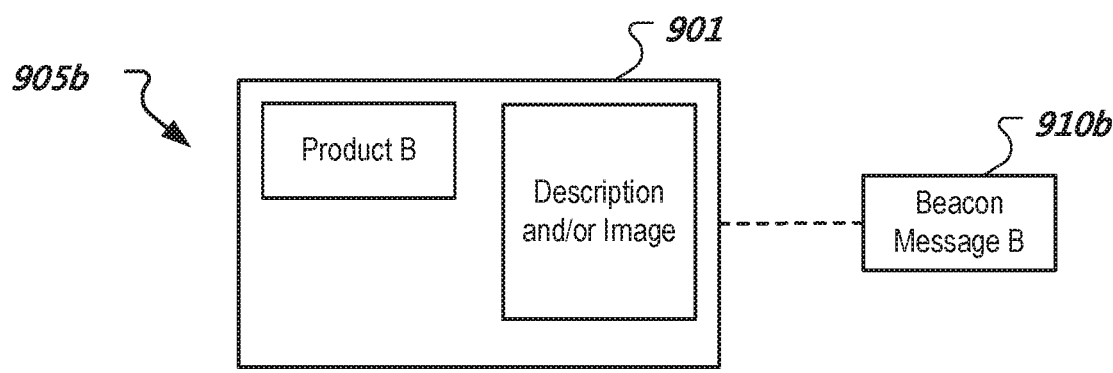
Figure 9C:
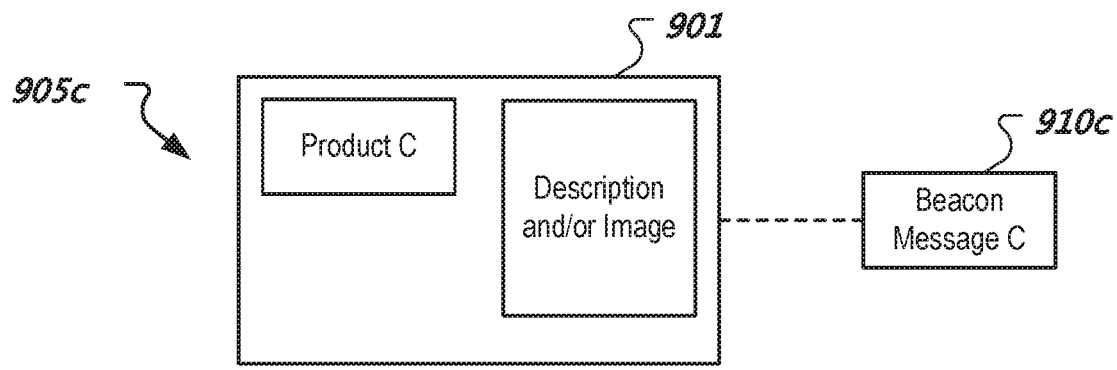

FIGS. 9A, 9B, and 9C illustrate example screenshots of a screen of an interactive beacon device 901 configured to cycle through content elements. In some implementations, the interactive beacon device 901 can be configured to cycle through a display of two or more different content elements such as items of a store catalog. In this example, the interactive beacon device 901 cycles through different display states 905*a-c*, as illustrated respectively by FIGS. 9A, 9B, and 9C, that correspond respectively to products A, B, and C. Each display state 905*a-c* can include an identification of a product, product description, and/or product image. Each display state 905*a-c* can be configured to present corresponding product information for a predetermined amount of time before a transition to the next product occurs.

In some implementations, the display states 905*a-c* correspond respectively to beacon messages 910*a-c*. The beacon messages 910*a-c* can include information associated with their respective products. For example, while information is displayed on a screen of the interactive beacon device 901 during display state 905*a*, the interactive beacon device 901 can be configured to transmit a beacon message 910*a* that corresponds to the current display state 905a (which corresponds to Product A). In some implementations, the beacon message 910a can include a product identifier corresponding to Product A. In some implementations, the beacon message 910a can include a URL for a web page containing additional information for Product A including an option to purchase the product. In some implementations, the beacon message 910a can include a value, such as a major/minor value, that corresponds to a URL for a web page containing additional information for Product A.

The features described may be implemented in digital electronic circuitry or in computer hardware, firmware, software, or in combinations of them. The features may be implemented in a computer program product tangibly embodied in an information carrier, e.g., in a machine-readable storage device, for execution by a programmable processor; and method steps may be performed by a programmable processor executing a program of instructions to perform functions of the described implementations by operating on input data and generating output.

The described features may be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that may be used, directly or indirectly, in a computer to perform a certain activity or bring about a certain result. A computer program may be written in any form of programming language (e.g., C, C++, Objective-C, Java), including compiled or interpreted languages, and it may be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer may communicate with mass storage devices for storing data files. These mass storage devices may include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with an author, the features may be implemented on a computer having a display device such as a CRT (cathode ray tube) or LCD (liquid crystal display) monitor for displaying information to the author and a keyboard and a pointing device such as a mouse or a trackball by which the author may provide input to the computer.

The features may be implemented in a computer system that includes a back-end component, such as a data server or that includes a middleware component, such as an application server or an Internet server, or that includes a front-end component, such as a client computer having a graphical user interface or an Internet browser, or any combination of them. The components of the system may be connected by any form or medium of digital data communication such as a communication network. Examples of communication networks include a LAN, a WAN and the computers and networks forming the Internet.

The computer system may include clients and servers. A client and server are generally remote from each other and typically interact through a network. The relationship of client and server arises by virtue of computer programs running on the respective computers and having a client-server relationship to each other.

One or more features or steps of the disclosed embodiments may be implemented using an Application Programming Interface (API). An API may define on or more parameters that are passed between a calling application and other software code (e.g., an operating system, library routine, function) that provides a service, that provides data, or that performs an operation or a computation. The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API. In some implementations, an API call may report to an application the capabilities of a device running the application, such as input capability, output capability, processing capability, power capability, communications capability, etc.

As described above, some aspects of the subject matter of this specification include gathering and use of data available from various sources to improve services a mobile device can provide to a user. The present disclosure contemplates that in some instances, this gathered data may identify a particular location or an address based on device usage. Such personal information data can include location-based data, addresses, subscriber account identifiers, or other identifying information.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

In the case of advertisement delivery services, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publically available information.

A number of implementations have been described. Nevertheless, it will be understood that various modifications may be made. Elements of one or more implementations may be combined, deleted, modified, or supplemented to form further implementations. As yet another example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A system, comprising:
 a network interface configured to communicate with mobile devices; and
 one or more mobile devices comprising processor electronics configured to store applications, including an application, for download to the mobile devices via the network interface,
 wherein the application comprises instructions to cause a mobile device to perform operations comprising:
  receiving a beacon message from an interactive beacon device over a first communication link, the beacon message comprising first information corresponding to a transaction initiated using the interactive beacon device, wherein the information includes a product or service that was selected using the interactive beacon device;
  automatically presenting a notification based on the receipt of the beacon message;
  following an acceptance of the notification, presenting, on a user interface of the mobile device based on the first information, (i) one or more product or service descriptions of the product or service corresponding to the transaction, (ii) one or more customizations associated with the product or service that were selected using the interactive beacon device and (iii) one or more options for further customizations associated with the one or more product or service;
  following a determination as to whether the product or service was further customized by the mobile device, receiving an input to complete the transaction;
  in response to receiving the input to complete the transaction, obtaining payment information; and
  transmitting, to a server configured to process the transaction over a second communication link that is different than the first communication link, second information corresponding to the transaction, the second information including the payment information and one or more product identifiers associated with the product or service.

2. The system of claim 1, wherein receiving the first information corresponding to the transaction comprises receiving one or more identifiers corresponding to the one or more product or service descriptions, and wherein the one or more product or service descriptions are selected from an interactive store catalog using the interactive beacon device.

3. The system of claim 2, wherein the first information comprises a transaction identifier, and wherein the application is configured to obtain the one or more identifiers from a server based on the transaction identifier.

4. The system of claim 1, wherein the application is configured to obtain the one or more product or service descriptions from a server.

5. The system of claim 1, wherein transmitting the second information to the server comprises encrypting the second information using a public key associated with the server.

6. The system of claim 5, wherein the payment information comprises a credit card number.

7. The system of claim 1, wherein the payment information comprises a user account identifier associated with a user account that has a charging capability.

8. The system of claim 1, wherein the first information is received from the interactive beacon device using a short-range communication link, and wherein the second information is transmitted to the server using a long-range communication link.

9. The system of claim 1, wherein content of the beacon message that is related to the product or service received from the interactive beacon device is different from content of another beacon message that is related to a second product or service received from the interactive beacon device.

10. The system of claim 1, wherein the one or more customizations associated with the one or more product or service and selected using the interactive beacon device comprises one or more customizations that are selected using the interactive beacon device following selection of the one or more product or service using the interactive beacon device.

11. A method comprising:
 receiving, by a mobile device configured to communicate with other mobile devices over a first communication link, a beacon message from an interactive beacon device, the beacon message comprising first information corresponding to a transaction initiated using the interactive beacon device, wherein the information includes a product or service that was selected using the interactive beacon device;
 automatically presenting, by the mobile device, a notification based on the receipt of the beacon message;
 following an acceptance of the notification, presenting, by the mobile device and on a user interface of the mobile device based on the first information, (i) one or more product or service descriptions of the product or service corresponding to the transaction, (ii) one or more customizations associated with the product or service that were selected using the interactive beacon device and (iii) one or more options for further customizations associated with the one or more product or service;

following a determination as to whether the product or service was further customized by the mobile device, receiving, by the mobile device, an input to complete the transaction;

in response to receiving the input to complete the transaction, obtaining, by the mobile device, payment information; and transmitting, by the mobile device to a server configured to process the transaction over a second communication link that is different than the first communication link, second information corresponding to the transaction, the second information including the payment information and one or more product identifiers associated with the product or service.

12. The method of claim 11, wherein receiving the first information corresponding to the transaction comprises receiving one or more identifiers corresponding to the one or more product or service descriptions, and wherein the one or more product or service descriptions are selected from an interactive store catalog using the interactive beacon device.

13. The method of claim 12, wherein the first information comprises a transaction identifier, and wherein the method further comprises obtaining the one or more identifiers from a server based on the transaction identifier.

14. The method of claim 11, further comprising obtaining the one or more product or service descriptions from a server.

15. The method of claim 11, wherein transmitting the second information to the server comprises encrypting the second information using a public key associated with the server.

16. The method of claim 15, wherein the payment information comprises a credit card number.

17. The method of claim 11, wherein the payment information comprises a user account identifier associated with a user account that has a charging capability.

18. The method of claim 11, wherein the first information is received from the interactive beacon device using a short-range communication link, and wherein the second information is transmitted to the server using a long-range communication link.

19. The method of claim 11, wherein content of the beacon message that is related to the product or service received from the interactive beacon device is different from content of another beacon message that is related to a second product or service received from the interactive beacon device.

20. The method of claim 11, wherein the one or more customizations associated with the one or more product or service and selected using the interactive beacon device comprises one or more customizations that are selected using the interactive beacon device following selection of the one or more product or service using the interactive beacon device.

* * * * *